Figure 1:
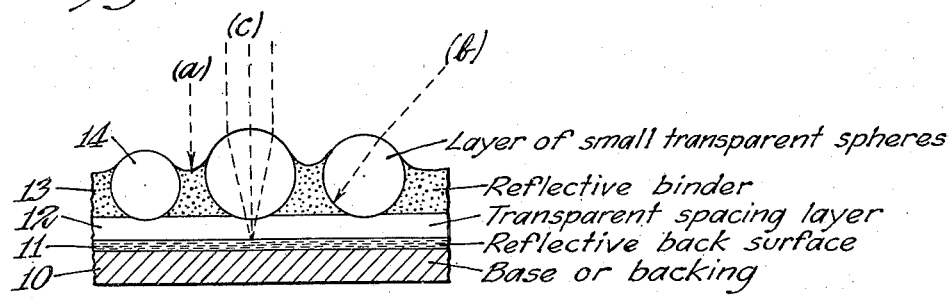

July 3, 1945.  M. L. GEBHARD  2,379,702

REFLEX LIGHT REFLECTOR

Filed Jan. 23, 1943

Inventor
Melvin L. Gebhard
By Carpenter, Abbott, Coulter & Kinney
Attorneys

Patented July 3, 1945

2,379,702

UNITED STATES PATENT OFFICE 2,379,702

REFLEX LIGHT REFLECTOR

Melvin L. Gebhard, St. Paul, Minn., assignor to Minnesota Mining & Manufacturing Company, St. Paul, Minn., a corporation of Delaware Application January 23, 1943, Serial No. 473,347

6 Claims. (Cl. 88—82)

This invention relates to "reflex" light reflectors of the class in which a layer of contiguous small transparent spheres or glass beads overlies light-reflecting means, being held in position by a binder, and serves as an interposed light-refracting and collimating means so that an incident beam or ray of light is selectively returned toward the source as a brilliant cone of light, even though the incident light strikes at an angle.

Highway signs of the reflex type have greater visibility at night, to the occupants of approaching vehicles, because less of the reflected light is dissipated outside of the field of viewing, the light being concentrated in a narrow cone which is substantially coaxial with the incident beam of light. The general properties of such beaded reflex reflectors which make for utility in signs and markers are discussed in the Palmquist Patent No. 2,294,930, issued September 8, 1942.

The present invention provides novel types of internal structure in such reflex reflectors for controlling the optical characteristics so as to produce novel reflex reflecting characteristics.

Figure 2:
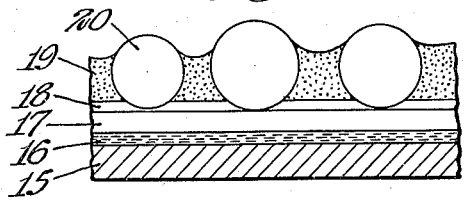
Figure 3:
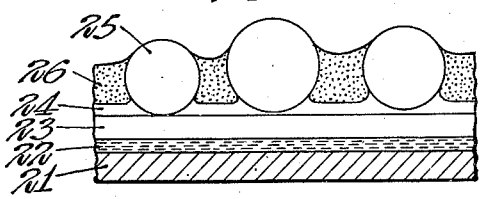

The nature of the invention can best be described in connection with the illustrative structures shown in the drawing, where:

Figs. 1, 2 and 3 are magnified diagrammatic views of different reflex reflectors intended to bring out the structure rather than to serve as literal section views. Thus the spheres are spaced farther apart than is customary; and each circle represents a full circumference, which would not be the case in a true section since the spheres are not actually arranged in rows but are packed so that a section plane could not be passed through the centers of a series of adjacent spheres.

Referring to Fig. 1, there is shown in diagram form a beaded reflex reflector, having a base or backing 10 (which may be rigid or flexible) provided with a reflective surface 11. This reflective surface may be the surface of the backing itself, as where the latter is an inherently reflecting material such as aluminum foil, or may be formed by an applied sheet or coating which is reflective. This reflective surface is covered by a transparent spacing coating or layer 12, which maintains the beads a predetermined distance from said reflective surface, and it in turn is covered by a reflective binder layer 13 in which a layer of transparent spheres (such as small glass beads) 14 are partially embedded. The spheres penetrate the binder layer so as to touch, or be slightly embedded in, the transparent spacing layer. The outer extremities of the spheres are exposed and constitute a multiplicity of contiguous convex lens elements which may be entered by incident light rays which strike them.

External reflection of incident light occurs at the exposed outer surfaces of the reflective binder, lying between the spheres, as illustrated by light ray $a$. In addition, rays incident upon the spheres at a substantial angle will be internally reflected by the reflective binder where it contacts the lower sides of the spheres to form a reflective spherical band or zone as illustrated by light ray $b$. If this binder is white, for example, the reflector will appear white by day, resembling an ordinary sign surface which is painted white. If the binder is yellow, the appearance will be yellow, etc. During the day, the surface of a sign area having a reflector structure of this type, illuminated by diffused day-light, thus has an appearance determined primarily by the color of the reflective binder in which the spheres are embedded. There are a large number of spheres per square inch. The spheres are ordinarily a few thousandths of an inch (a few mils) in diameter and are not individually visible to the observer when even a relatively short distance away, so that the outer surface appears as though uniformly covered by a paint of the color of the binder. Under day viewing conditions, the appearance is but little affected by the presence and color of the back reflective surface 11, for reasons presently to be discussed.

Now consider the reflex reflecting characteristics, which are of importance when the reflector is illuminated by a beam of light with the observer being located near the axis of the beam, as occurs at night in the case of an automobile approaching a highway sign. In this case the feature of reflex reflection is that visibility exists even when the observer is so far away that he cannot see the reflected light which results from external reflection at the outer surface of the binder; such externally reflected light being diffused in all directions as in the case of an ordinary sign.

Suppose, first, that the sign is set vertically beside the road at substantially right angles to it, and that the approaching car is a great distance away, so that incident light rays impinge substantially normally to the plane of the sign, or have a relatively small angle of incidence. Paraxial rays of such a beam are illustrated by $c$ in Fig. 1. The rays are refracted upon penetrating the convex surface of each sphere, so as to converge upon the back reflective surface 11, passing through the sphere and the transparent spacing layer. No refraction occurs at the rear surface of the sphere when the sphere and spacing layer have the same refractive index, but they need not have the same index. No spacing distance exists which would result in convergence of all the incident rays to a point (perfect focus) upon the reflective surface, even if the spheres were perfectly round, due to spherical aberration which is very pronounced. It has been experimentally determined that a spacing distance of 20-50% of the sphere diameter results in optimum brilliancy, when the sphere has the refractive index of ordinary glass (about 1.50-1.55); and a good rule to follow is to employ a spacing of about one-third the average bead diameter. However, a lesser degree of spacing can be used. For a fuller discussion of the effect of spacing and the factors involved, see Palmquist Patent No. 2,294,930.

The convergent rays striking reflective surface 11 are reflected and return as a divergent cone through the transparent spacing layer and transparent sphere, and upon emerging are refracted so as to reduce the angle which they make with the optic axis. The emergent rays are largely concentrated in a narrow cone coaxial with the incident rays and return toward the light source as a brilliant divergent beam, the degree of divergency depending upon the nature of the reflective surface and the extent of the spacing between the sphere and the reflector surface.

This phenomenon occurs even when the rays are incident at an angle, whence the designation "reflects." However, the limited aperture at the rear of the sphere, produced by the reflective binder, will pass only those incident rays which approach with a relatively small angle of incidence.

As the car approaches more closely to the sign, the angle of incidence increases until only a few rays can penetrate to the back reflective surface, and these cannot return. But as the angle of incidence becomes relatively large, the rays striking each sphere will largely converge upon the concave surface of the reflective binder 13 which is in direct contact with the intermediate or side surfaces of each sphere, forming a spherical band or zone, and will be reflected therefrom. This is illustrated by incident ray b in Fig. 1. These rays also will be reflexively reflected in a cone directed toward the light source, but the cone will be broader since there is no spacing between the sphere and the reflective binder surface. This is an advantage, since the closer the car is to the sign, the greater the angle subtended at the sign by the incident light rays and those returning rays which reach the eyes of the observer in the car; and hence the greater the divergency of reflected rays which is needed to prevent the observer from being outside the cone of brilliant light. The effect of this greater divergency in reducing the concentration of light is offset by the fact that the observer and light source are now relatively much closer to the sign, which in itself increases visibility.

Thus this structure provides a reflex reflector wherein maximum brilliancy and visibility are provided when most needed, as in the case of a car approaching a highway sign and which is a great distance away, when the light rays from its headlights strike with a relatively small angle of incidence and the reflected light should be concentrated in a narrow cone. The structure combines with this the ability to reflexively reflect light which strikes at a relatively large angle of incidence, the reflected light returning in a broader cone conforming to the need for greater divergency as the car comes close to the sign. During the intermediate part of the car's approach, some light will be reflected from each type of reflective surface, so that a gradual shift occurs from light largely reflected from the spaced back reflector surface 11, to light largely reflected from the concave, unspaced surface of the binder 13, with a desirable change of mixture occurring during the transition from distant viewing to close viewing.

This feature exists even when both reflective surfaces are of the same type, as for example, when reflective surface 11 and reflective binder 13 are of the white paint kind (illustrated by a coating composition pigmented with titanium dioxide or other white diffusing pigment).

The maximum-distance visibility can be further stepped up by employing a back reflective surface 11 which is of the semi-specular type, as by providing a metallic reflective surface. Thus a layer of flaked aluminum paint can be used, which is applied to the backing so that the aluminum flakes lie approximately parallel to the flat surface when the paint has dried. An aluminum foil, used either as the sole backing or laminated to a support, will provide a more highly specular reflector. The reflective binder 13 may also be of the metallic or semi-specular type, as by using a binder pigmented with aluminum flakes. Thus both reflectors may be semi-specular. However, a very desirable combination is to use a non-specular reflective binder (such as a binder pigmented with titanium dioxide), and a semi-specular back reflector; as this gives a generally more effective type of reflection for highly angular incident rays, as to which a broad divergency of reflected rays is usually desired. Furthermore, such non-specular pigmented binder will provide a more efficient external reflection for rays striking between the spheres, and makes for a better daytime visibility and appearance. Under night viewing conditions, such a combination results in a silver appearance when viewed from a distance (the back reflector being aluminum paint or foil); and a white appearance when viewed close up by highly angular rays, if the binder is white, or a colored appearance if a colored binder is used (such as one colored with a yellow pigment).

Other multi-color effects can be obtained. For example, the reflector 11 may be a white pigmented layer, while the binder 13 is pigmented with a yellow or other reflective colored pigment. The daytime appearance will be yellow, and likewise the night appearance when the light strikes with a relatively large angle of incidence. White light will be reflected when the light is incident at a small angle. When a highway sign is viewed from an approaching car at a great distance, a reflex reflecting area of this type will appear white; and as the car approaches, the appearance will change to light yellow and then to a deeper and deeper yellow as more and more of the incident light is reflected by the binder with the angle of incident light steadily increasing. This also enables the driver to estimate his approximate order of distance from the sign, which is of value in the case of stop signs, etc. The changing appearance is of value in advertising signs, as an additional means of attracting curiosity and attention.

In general, it is desirable for the back reflector to be of the white or metallic type, to secure maximum reflection and minimum absorption of light, making for visibility at the greatest distance. However, as in the case of advertising signs where it is desired to provide novelty and attract interest, a colored back reflector may be combined with a binder having a different color. Thus the back reflector might be yellow and the binder might be red, so that the appearance will gradually change from yellow through orange to red as the sign is approached. To increase reflection, light tones may be used, as by including some white pigment with the colored pigment. A further illustration is a yellow back reflector combined with a light blue binder (white pigment being included in the latter to increase reflectivity); which will result in the sign area changing from yellow through green to blue as the sign is approached.

It has been mentioned that when spheres having the refractive index of ordinary glass (about 1.50-1.55) are used, that optimum spacing of the beads from the back reflective surface amounts to 20-50% of the sphere diameter. The spheres will vary somewhat in diameter, even when finely graded, and an average value is used. In some cases it may be considered desirable to use less spacing than that which produces maximum-distance visibility, in order to secure a greater divergency in the cone of light reflected from the back reflective surface. Thus adjustment of the spacing distance provides a way of varying the reflex reflecting characteristics. The spacing distance for maximum-distance visibility is a function of the refractive index of the spheres. Assuming that the transparent spacing layer has substantially the same refractive index as the spheres, the optimum distance decreases from about 35% of the sphere diameter at an index of 1.50-1.55, to a zero value at a refractive index of 1.85-1.90 and, in the other direction, it increases as the refractive index decreases. The optimum spacing will be less or greater if the transparent spacing layer, which contacts the rear surface of the spheres, has an index less or greater, respectively, than that of the spheres, owing to refraction at the boundary.

With respect to bead size, the upper practical limit is about 50 mils (average) diameter; while the lower practical limit is about 3 mils (average), determined by the need of getting a smooth bead coat with uniform and controlled bonding and spacing. The use of very small beads, a few mils in diameter, is advantageous not only in reducing costs and improving the structural strength, but in securing a relatively flat and "smooth" outer surface which lends itself to printing and screen process stenciling. Thus in making a sign, a sheet of the reflex reflector may be painted or printed so as to "black out" certain areas, or cover them with a colored coating different from that of the bead binder.

Referring to Fig. 2, a variant structure is shown which is the same as that of Fig. 1 except that a thin transparent binder covers the transparent spacing layer beneath the reflective binder. This structure has a base or backing 15 provided with a reflective surface 16, which is covered with a transparent spacing layer 17. In constructing the reflector, a fluid or plastic transparent coating is applied over the solid spacing layer, adapted to dry or set-up to a solid state to form a thin, transparent layer 18. Before the latter has solidified, a reflective binder coating 19 is applied, and the spheres or beads 20 are applied over the latter so as to sink through the reflective binder and into or through the transparent binder layer 18. This results in a better aperture through which rays pass, in going to or from the back reflective surface. The transparent binder layer 18 is relatively thin so as not to unduly interfere with the desired side reflection from the surface of the reflective binder.

Fig. 3 shows a similar construction except that the order of applying the reflective binder and the spheres is reversed. Base or backing 21, having reflective surface 22, is covered by solid transparent spacing layer 23. Over the latter there is applied a thin transparent binder coating 24, into which the layer of spheres 25 is pressed so as to substantially contact the transparent spacing layer 23, the spheres being applied before the transparent binder coating has dried or set-up to a solid condition. Owing to capillarity, the transparent binder will rise along the spherical surfaces as shown in the drawing, so that its upper edges will be above the binder surface midway of the spheres. This results in a still broader aperture, so that rays having a substantial angle of incidence will reach the back reflector. But the coating is still sufficiently thin to permit of incident rays of relatively large angle of incidence being reflected at the sides of the spheres by the reflective binder 26, which is applied last of all, over the spheres, in sufficient amount to fill the spaces and provide holding sockets for the spheres, and side reflectors. Binder material which covers the outer extremities of the spheres, as a result of this method of application, can subsequently be removed, as by buffing, so that the spheres are exposed to incident light.

Reference is made to the Palmquist Patent No. 2,294,930, issued September 8, 1942, for a description of various backings and backing treatments, and various transparent coatings, and reflective coating compositions, which may be employed in making reflex reflector signs or sheeting of the type herein disclosed. Hence a detailed description of various expedients is deemed unnecessary.

*Example*

A making description will now be given of an illustrative reflex reflector sheeting which is flexible and weatherproof and may be employed in making outdoor signs, and which has the type of structure shown in Figure 2.

A reflective backing is first made. This may comprise a paper sheeting which has been impregnated to seal and waterproof it, and which is coated on one face with a reflective layer, as by applying a coating composition containing a pigment which is white or yellow, etc., or a varnish containing aluminum flakes adapted to form a semi-specular reflective surface of "silvery" appearance. See pages 8 and 9 of said Palmquist Patent No. 2,294,930. A waterproof, flexible and somewhat stretchy, reflective backing which is non-fibrous may be used, as by employing a "Butvar" (polyvinyl butyral) film, one face of which is coated with a reflective layer, which may be formed by applying a volatile solution of "Butvar" containing pigment or aluminum flakes, for example, followed by drying.

Illustrating a specific construction, use may be made of the vulcanized rubber-resin impregnated paper set forth in "Example 1" of said Patent No. 2,294,930, which is provided with a semi-specular silver type reflective surface by coating with aluminum varnish as set forth in "Example 2" of said patent. This may be made up in a web of great length and is then further processed as follows:

The reflective surface of the web is roll coated with a transparent composition adapted to be cured to form the transparent space coat 17 of Fig. 2. The thickness of the cured space coat may be about one-third the average diameter of the spheres employed, when ordinary glass beads are used (refractive index about 1.50–1.55), to secure optimum reflex brilliancy. In the case of No. 10 glass beads, having an average diameter of approximately 6 to 7 mils, this would call for a final space coat thickness of about 2.0 to 2.5 mils. If beads of higher refractive index are used, the optimum thickness would be less, as for example if No. 10 beads of 1.65 index are used, a good thickness would be 1.0 to 1.5 mils.

A suitable coating composition for this purpose is an 80% solution in Hydrosolvent No. 2 of a drying-oil modified type alkyd resin (oxidizing type), a type well known in the synthetic resin varnish art. The coating may be cured in 24 hours at say 185° F. An illustrative alkyd resin of this type may be compounded from

|  | Parts by weight |
|---|---|
| Phthalic anhydride | 176 |
| Glycerine | 93 |
| Linseed oil fatty acid | 166 |
| Dehydrated castor oil | 63 |

The Hydrosolvent No. 2 is a volatile petroleum solvent fraction which is aromatic in character, and may be substituted for by benzol or toluol or mixtures thereof.

Following curing of the space coat, the thin transparent coat 18 and the reflective binder 19 (Fig. 2) are successively applied, and neither is dried nor cured until the spheres have been embedded therein. The transparent coating composition may be composed of:

| "Rezyl 53" | 200 |
|---|---|
| "Beetle 227–8" | 100 |
| Hydrosolvent No. 2 | 15 |

The "Rezyl 53" is a liquid alkyd resin composition sold by American Cyanamid Co., composed of 65% of a two-component type alkyd resin and 35% of a plasticizer of the non-drying oil or non-drying fatty acid type, and may be replaced by a similar material. An illustrative two-component alkyd resin is the well known kind made from phthalic anhydride and glycerine. Castor oil is illustrative of non-drying oils and ricinoleic acid is the acid which can be derived therefrom as for example by heating together the glycerine and castor oil before adding the phthalic anhydride.

The "Beetle 227–8" is a 50% solution of urea-formaldehyde resin in a solvent composed of 60 parts butyl alcohol and 40 parts xylol, and is also sold by American Cyanamid Co.

This transparent coating is applied in amount to form a final layer which is but a small fraction of the sphere diameter (see Fig. 2), and may be applied by roll coating.

Without curing, there is then applied the reflective binder composition. This may be made by using the type of composition employed for the transparent space coat, previously described, and milling in a pigment, such as titanium dioxide to make a white binder (the weight of the titanium dioxide being about equal to the resin weight, and a trace of Ultramarine Blue being added as a white intensifier). This binder composition may be applied with a knife coater to spread it out to the desired thickness, which should be such that it holds the spheres firmly in sockets but leaves the extremities exposed in the product (see Fig. 2).

The spheres, such as No. 10 glass beads, are then applied over the soft surface, and the excess removed, to leave a single layer. The sheet is nipped between rollers to press the beads down through the binder layer and into transparent coating 18, to substantially the surface of spacing layer 17 (see Fig. 2). The forcing of the beads into transparent coating 18 results in the latter wiping the lower extremities substantially clean of the pigmented binder; and it also makes for a broader optic aperture for light rays to reach the underlying reflective surface 16, so that rays incident at a substantial angle from the normal can reach the latter.

The fully coated and beaded sheet may then be cured, to set-up the last applied coatings, by oven heating on racks for 24 hours at 185° F.

Having described various illustrative embodiments of the invention, but without intent to be limited thereto, what is claimed is as follows:

1. In a flexible, reflex reflector sheet material adapted to use in making outdoor signs having long range visibility coupled with good angularity characteristics under night viewing conditions, a flexible reflector having a silvery metallic reflective surface, an overlying layer of small transparent spheres, and a non-specular reflective binder in which said spheres are partially embedded so that an internally reflecting non-specular spherical band or zone is provided around the lower side of each sphere, the inner extremities of the spheres being clear and in optical connection with the underlying silvery metallic reflective surface.

2. A flexible reflex reflector sheet adapted to use in making outdoor signs, comprising a flexible back reflector, a layer of small transparent spheres spaced therefrom, an interposed solid transparent spacing medium contacted by the inner extremities of the spheres and providing optical passage to said back reflector, and a reflective binder overlying said transparent spacing medium and forming a reflective band around the lower side of each sphere to provide internal reflection of highly angular incident rays, said back reflector and said reflective binder being dissimilar in color reflecting properties so that the reflex reflecting appearance changes as the incident light angle varies from relatively small to relatively large, the exterior surface of said binder being exposed to view by externally reflected light.

3. A reflex light reflector sheet adapted for use as a sign or marker, comprising a back light reflector, a transparent solid layer overlying said reflector, a distinct reflective binder coating layer overlying the transparent layer, and a layer of contiguous small transparent spheres partially embedded in the reflective binder coating so that the inner extremities of the spheres are in optical connection with the underlying spaced-away back reflector, and the binder coating provides a reflective band around the inner side of each sphere; the spheres having an average diameter not exceeding 50 mils and there being a large number per square inch so as to permit of a relatively smooth and uniform outer surface which lends itself to painting and printing over the layer of spheres.

4. A reflex light reflector sheet according to claim 3, wherein the back reflector is of the silvery metallic type having a specular characteristic, and the reflective binder layer is of the non-specular pigmented type.

5. A reflex light reflector sheet according to claim 3, wherein the reflective binder layer has a different color than the back reflector so that the reflex reflecting appearance changes as the incident light angle varies from relatively small to relatively large.

6. A reflex light reflector sheet adapted for use as a sign or marker, comprising a metallic back reflector having a specular characteristic, an overlying light-returning layer of small transparent spheres, and a non-specular reflective binder coating layer in which said spheres are partially embedded so that the inner extremities of the spheres are in optical connection with the metallic back reflector, and the binder coating provides a non-specular reflective band around the inner side of each sphere, such that light striking the spheres with a small angle of incidence will undergo internal reflection from the underlying metallic reflector while substantial angular rays will be internally reflected from the non-specular reflective binder surfaces in contact with the sides of the spheres; the spheres having an average diameter not exceeding 50 mils and there being a large number per square inch so as to permit of a relatively smooth and uniform outer surface which lends itself to painting and printing over the layer of spheres.

MELVIN L. GEBHARD.